(12) United States Patent
Horn et al.

(10) Patent No.: US 7,703,404 B2
(45) Date of Patent: Apr. 27, 2010

(54) SEED TANK ARRANGEMENT AND PLANTER

(75) Inventors: Rodney Samuel Horn, Woodridge, IL (US); Ben Coats, Antioch, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/013,938

(22) Filed: Jan. 14, 2008

(65) Prior Publication Data
US 2009/0178600 A1 Jul. 16, 2009

(51) Int. Cl.
A01B 49/00 (2006.01)
A01B 63/00 (2006.01)
A01C 5/00 (2006.01)
A01C 7/00 (2006.01)
A01C 7/18 (2006.01)

(52) U.S. Cl. ............................. 111/54; 111/57; 111/66; 111/174; 111/925; 172/311; 172/456

(58) Field of Classification Search ................. 111/174, 111/186, 179, 925, 52, 54, 57, 62, 63, 66; 172/311, 452, 456
See application file for complete search history.

(56) References Cited

U.S. PATENT DOCUMENTS

| 151,561 | A | 6/1874 | Brown |
| 4,541,549 | A | 9/1985 | Hadley |
| 5,538,286 | A | 7/1996 | Hoff |
| 5,947,040 | A | 9/1999 | Gregor |
| 6,068,277 | A | 5/2000 | Magnussen |
| 6,502,645 | B1 | 1/2003 | Brueggen |
| 6,520,100 | B1 | 2/2003 | Spooner |
| 6,581,530 | B1 | 6/2003 | Hall |
| 6,672,229 | B2 * | 1/2004 | Lee et al. ..................... 111/200 |
| 6,772,702 | B2 * | 8/2004 | Lee et al. ..................... 111/174 |
| 6,935,254 | B2 | 8/2005 | Ostrander |
| 6,971,324 | B1 * | 12/2005 | Beck ........................... 111/200 |
| 6,994,274 | B2 | 2/2006 | Thompson |

FOREIGN PATENT DOCUMENTS

FR 2567169 7/1984

* cited by examiner

Primary Examiner—Christopher J. Novosad
(74) Attorney, Agent, or Firm—Rebecca L. Henkel; John William Stader

(57) ABSTRACT

A seed tank arrangement is provided with improved access to seed tanks of an agricultural planter and the contents thereof, while simplifying the manufacturing of such tanks. The seed tank has a fill opening formed in the upper surface of the tank for loading and accessing seeds in the interior of the tank. Features of the tank are mirror images about a diagonal plane of the tank, which enables the same tank to be used for both the left and right sides of the planter. This is achieved by rotating the left tank 90 degrees with respect to the right tank. The design provides improved access to the interior of the tanks for filling and servicing the seed.

7 Claims, 5 Drawing Sheets

SEED TANK ARRANGEMENT AND PLANTER

BACKGROUND

The present invention relates generally to agricultural implements, and more particularly to a planter or similar implement designed to be towed behind a work vehicle, and that is equipped with seed tanks to assist with seed distribution.

A wide range of agricultural implements are known and are presently in use, particularly designed for towing behind a work vehicle, such as a tractor. In one family of such implements, including tillers, planters, and so forth, a wide swath of ground can be tilled, planted, or otherwise worked in each pass of the implement in a tilled or untilled field. Planters, for example, often include frames supported by series of wheels and a tool bar extending transversely with respect to a line of movement of the implement across the field. Attached to the tool bar are a series of row units for dispensing seeds in parallel rows either in tilled or untilled soil. A pair of seed tanks are typically supported on the implement support structure, such as just forward of or over the tool bar. Large amounts of seed may be poured into these tanks and, as the implement is advanced across the field, seeds are transferred from the tanks by a distribution system connected to the row units.

Difficulties may arise in servicing such implements owing to the need to access the upper portions of the equipment, such as seed tanks in planters. The seed tanks may, for example, have fill openings or lids that can be removed to pour the desired seeds into the tanks prior to deploying the implement in a field. Such seeds may be inserted automatically, semi-automatically or manually into the tanks. Both before and after hauling the implement to and from the field, and while the implement is in a field, operator access to the seed tanks may be needed, such as for filling, inspection, removal of debris, and so forth. In traditional planter designs, however, the fill openings may be placed toward the center of the seed tanks, making access to the fill opening difficult, especially in the case of larger tanks. While this, in certain situations, may not pose particular problems, it renders many operations difficult, such as loading heavy sacks of seed into the tanks or removing debris from the tanks.

Difficulties may also occur in manufacturing seed tanks that have accessible fill openings. Tank designs may require separate manufacturing processes and parts for each left and right tank due to the need for off center tank fill openings. This requirement results in additional manufacturing costs as well as inconvenience for service or replacement.

There is a need, therefore, for improved arrangements in towed implements that permit operators to more easily access seed tanks in planters. There is a particular need for arrangements that permit an operator access to fill openings of the seed tanks for tasks such as filling and inspection. There is also a particular need for improved access seed tanks which have a low manufacturing cost.

BRIEF DESCRIPTION

The present invention provides a novel configuration for accessing planter seed tanks by virtue of the tank design and layout. This configuration of the seed tank provides improved access to seed tanks of an agricultural planter and the contents thereof, while simplifying the manufacturing of such tanks. In an exemplary embodiment, the seed tank has a fill opening formed in the upper surface of the tank for loading and accessing seeds in the interior of the tank. The opening is off center of the shell and is centered on a diagonal plane that bisects opposing corners of the tank. Features of the tank are mirror images about this diagonal plane of the tank, which enables the same tank to be used for both the left and right sides of the planter. This is achieved by rotating the left tank 90 degrees with respect to the right tank. The design provides improved access to the interior of the tanks for filling and servicing the seed. This tank configuration reduces manufacturing costs by utilizing one part for two elements of the implement. Alternative embodiments may utilize different shapes for the tanks, which remain symmetrical about a diagonally bisecting centerline. The design may be implemented for agricultural planters as well as other implements or applications requiring access to large tanks.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an," "the," "said," and the like mean that there are one or more of the elements. The terms "comprising," "including," "having," and the like are inclusive and mean that there may be additional elements other than the listed elements. Moreover, the use of "top," "bottom," "above," "below," and variations of these terms does not require any particular orientation of the components relative to some extrinsic reference, e.g., gravity. As used herein, the term "coupled" refers to the condition of being directly or indirectly connected or in contact. Additionally, the phrase "in fluid communication" or "fluidly coupled" indicates that fluid or fluid pressure may be transmitted from one object to another. As used herein, the word "exemplary" means "an example" and not necessarily a preferred embodiment.

Figure 1:
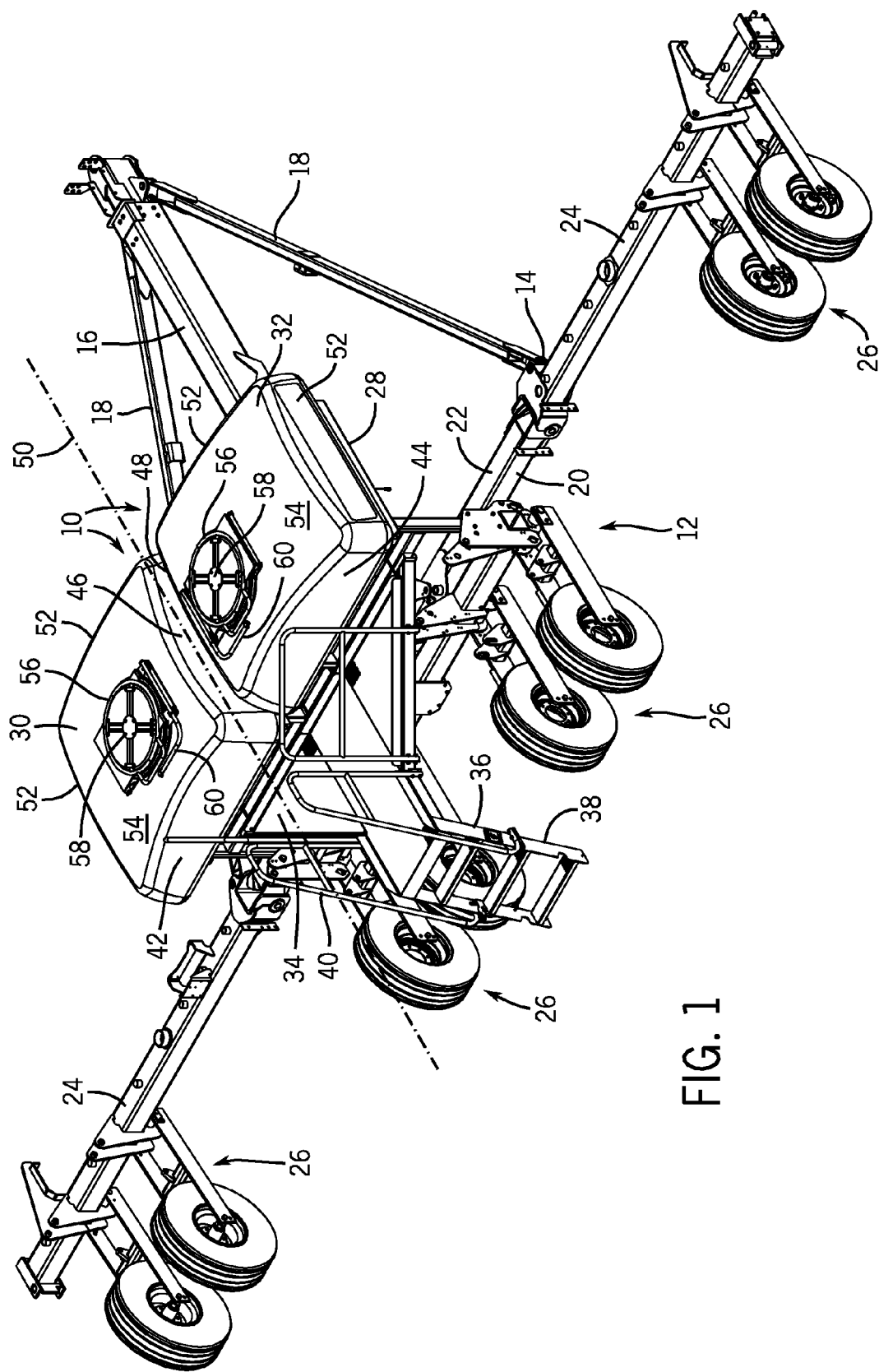
FIG. 1 is a rear perspective view of a planter in accordance with aspects of the invention, including seed tanks, a fixed platform or walkway, a retractable ladder for accessing a region near the upper components of the planter, particularly seed tanks.

Turning now to the drawings, and referring first to FIG. 1, seed tanks 10 are illustrated on an implement 12, illustrated in the form of a planter. The seed tanks 10 may be formed of steel or a moldable plastic material, such as polypropylene, by a plastic injection molding process, a rotomolding process, or any other suitable material. The implement 12 consists of a frame 14 and a tow bar 16 designed to be connected to a towing work vehicle, such as a tractor (not shown). The frame 14 and tow bar 16 may be made of any suitable material, such as structural steel. Seed tanks 10 are supported by frame 14 and the attached structures. Draft tubes 18 extend rearwardly from a forward end of tow bar 16 to aid in drawing the implement 12. A tool bar 20 is coupled to the tow bar 16 and draft tubes 18 and supports row units designed to distribute seeds, as described below. As will be appreciated by those skilled in the art, the tool bar 20 may define a central section 22 and outwardly extending wings 24 that can be folded forwardly to reduce the overall width of the implement for road transport. Row units, not shown for the sake of clarity, may be mounted along the tool bar 20 to facilitate seed distribution. Wheeled supports 26 are attached to support frame 14 to allow the row units to be raised out of contact with road surfaces during transport of the implement.

In the illustrated embodiment, seed tanks 10 are mounted on tank support structures 28 and frame 14. These support structures typically include structural steel and truss members. Left tank 30 and right tank 32 sit atop the support structures 28. Platform 34 enables user access to fill and service seed tanks 10. Access ladder 36 and folding portion 38 provide operator entry to platform 34. Hand rails 40 allow greater stability to the operator when climbing access ladder 36 and servicing the tanks.

In the illustrated embodiment, rear sides 42 and 44 along with center-oriented sides 46 and 48 compose generally vertical sides of seed tanks 10. Centerline 50 runs along the center of the planter 12 where left tank 30 and its features are generally a mirror image of the right tank 32. Outwardly oriented sides 52 compose the outer generally vertical sides of seed tanks 10. The upper surface 54 of seed tanks 10 completes the enclosure and provides access to contents through a fill opening 56. Cover assemblies 58 close the openings in the seed tanks, and levers 60 cooperate with the cover assemblies to maintain the assemblies closed and thereby to secure the contents of seed tanks 10. Cover assemblies 58 may be removed for loading of seeds in automated, semi-automated or manual operations. The covers also permit inspection of the seeds, removal of debris, and so forth.

Figure 2:
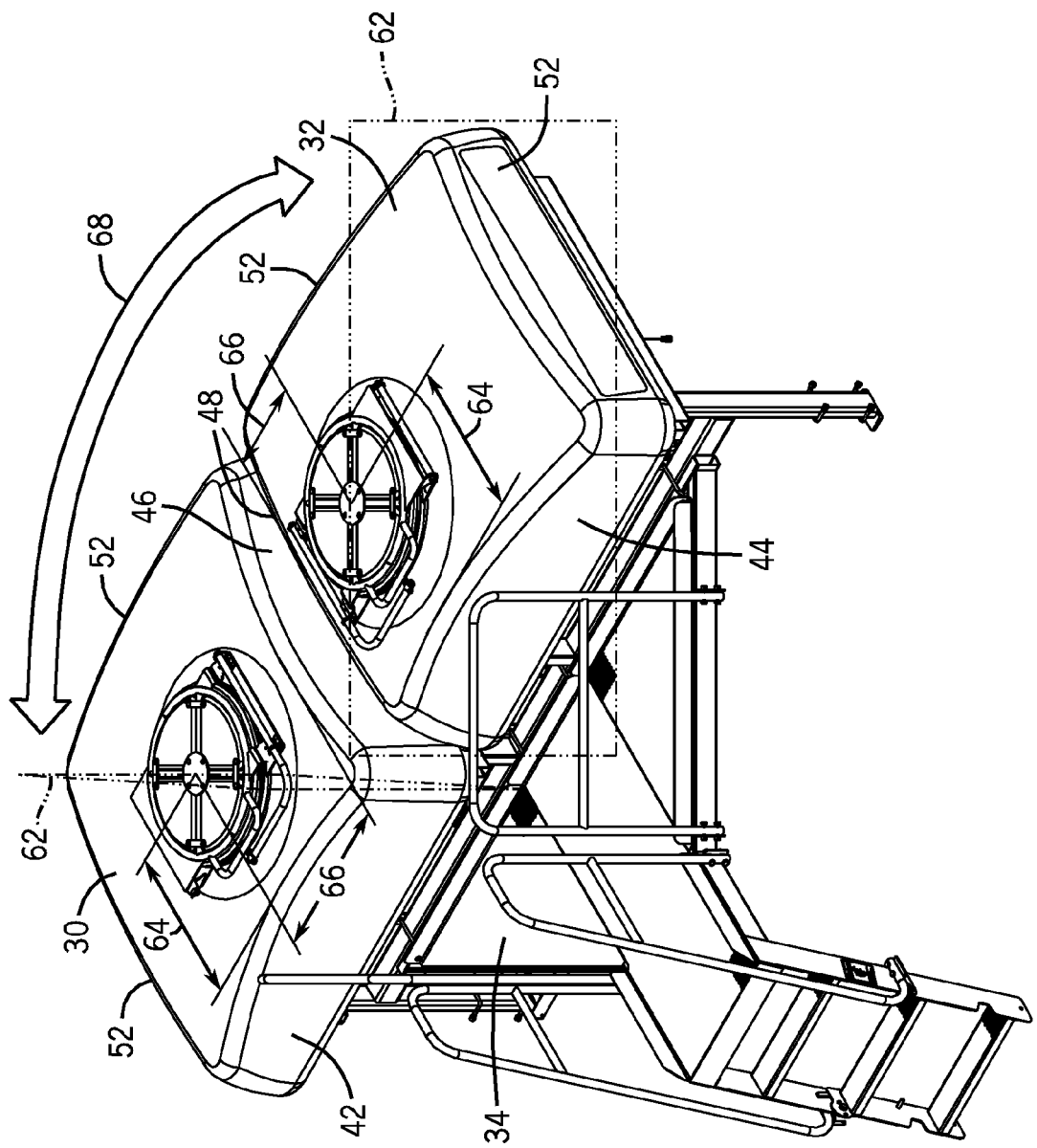
FIG. 2 is a more detailed view of the arrangement of FIG. 1, showing the platform or walkway and a presently contemplated arrangement for the seed tanks and the seed tank fill openings.

As shown in FIG. 2, vertical planes 62 bisect left tank 30 and right tank 32. The upper surfaces of the tanks have fill openings centered at distances 64 from rear sides 42 and 44 and distances 66 from center oriented sides 46 and 48. Distances 64 and 66 are generally equal, making each of the seed tanks 10 and their features symmetrical about vertical planes 62. Arrow 68 depicts the generally 90 degree angle between vertical planes 62. Arrow 68 further shows that left tank 30 and right tank 32 are mirror images of one another. That is, the tanks are identical, and are simply oriented at right angles or at a 90 degree rotation with respect to one another.

Figure 3:
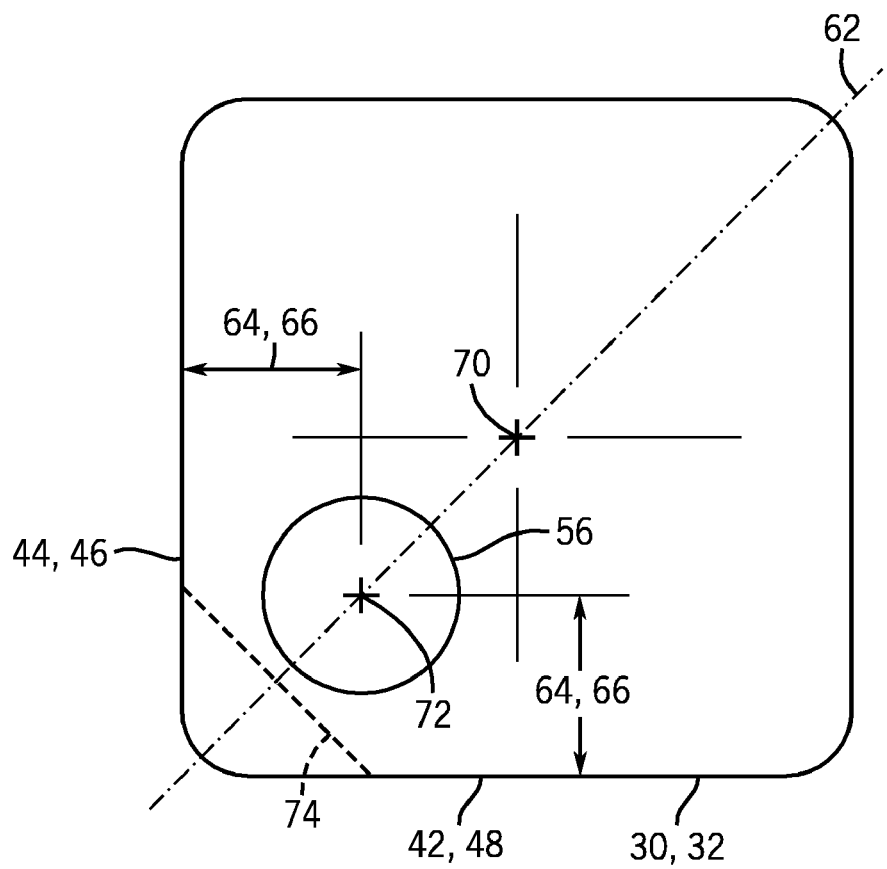
FIG. 3 is a top view of a seed tank from FIGS. 1 and 2, illustrating a diagonal plane that bisects the tank as well as a recess near the fill opening.

FIG. 3 illustrates the top view of seed tank 30 or 32. As noted above, fill openings 56 are located at equal distances 64 and 66 from rear sides 42 and 44 as well as center-oriented sides 46 and 48. Tank center 70 and fill opening center 72 are generally centered along vertical planes 62 which bisect each tank, as discussed above. In an alternative embodiment, additional operator access to fill opening 56 may be provided by recess 74. Recess 74 may be configured to be symmetrical about vertical plane 62, and located near fill opening 56. It should be noted that recess 74 creates an additional side, generally angled at 45 degrees with respect to adjacent sides 44 and 48 or adjacent sides 46 and 48.

Figure 4:
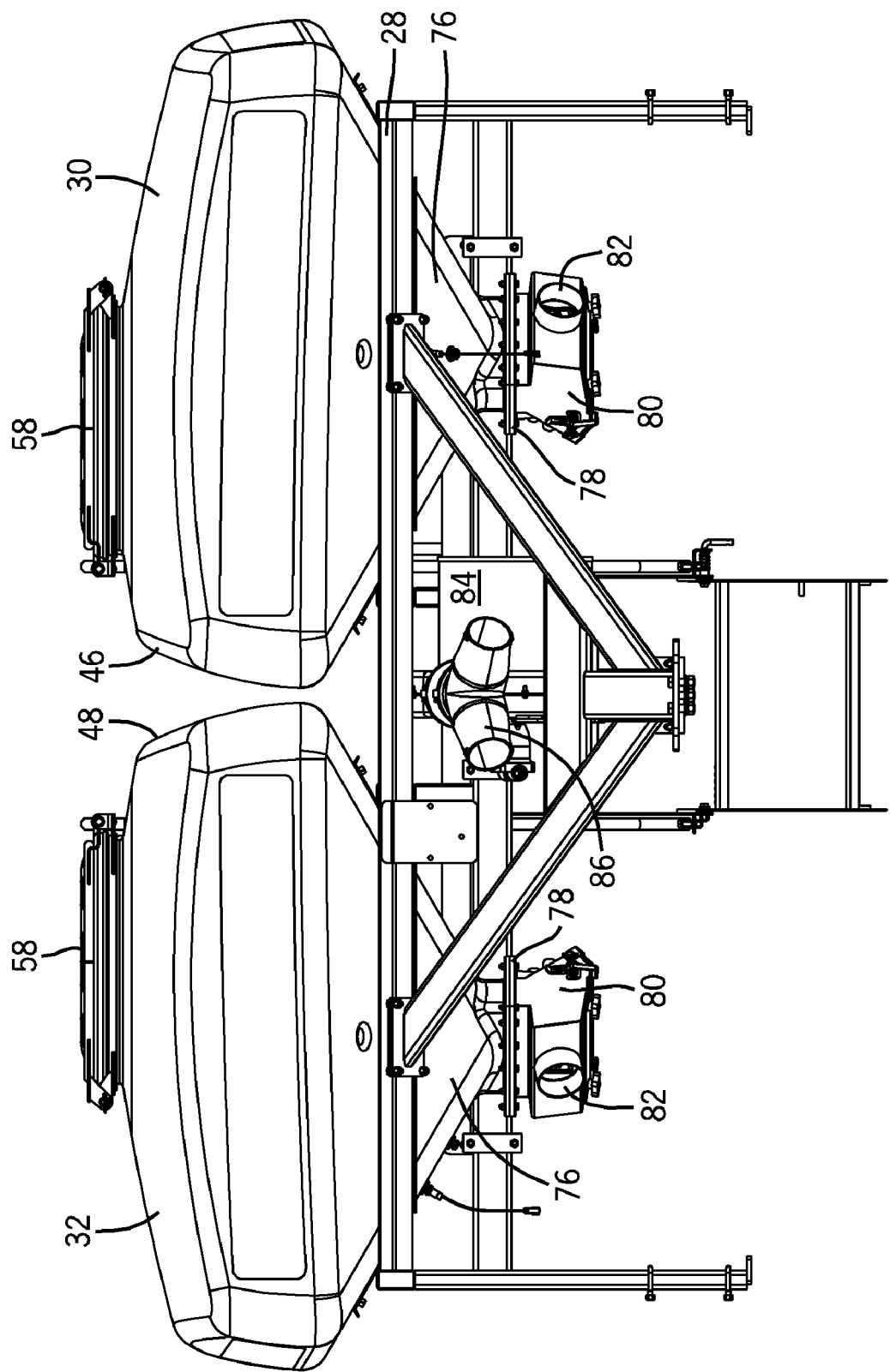
FIG. 4 is a detailed front view of the tanks and the frame that supports the tanks in accordance with aspects of the invention, including components of the seed distribution system.

As shown in greater detail in FIG. 4, chutes 76 are located on the lower portion of left tank 30 and right tank 32. Flanges 78 connect chutes 76 to induction boxes 80. As will be appreciated by those skilled in the art, these components channel seed from tanks 30 and 32 through box outlets (not shown) to row units (not shown) located on the tool bar. Inlet openings 82 are supplied air pressure from blower 84 through conduit 86 and tubes (not shown) forcing seeds from induction boxes 80 through the box outlets (not shown) to row units (not shown).

Figure 5:
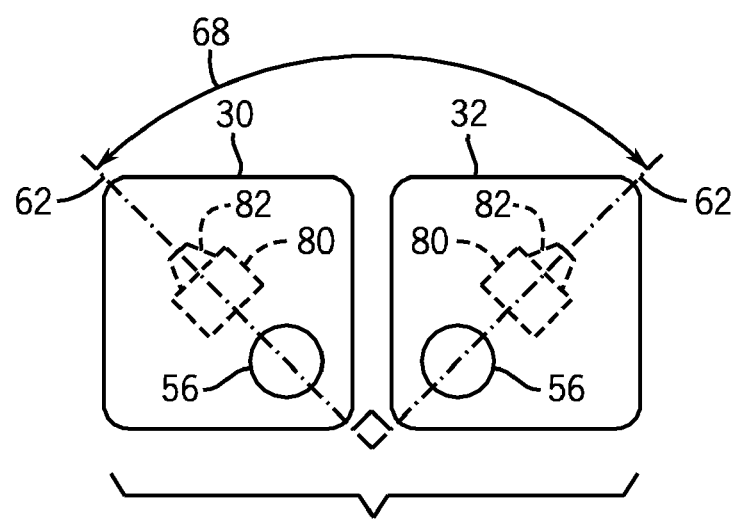
FIG. 5 is a top view of the seed tanks, showing induction boxes and inlet openings.

FIG. 5 illustrates a top view of left tank 30 and right tank 32 in somewhat greater detail. The arrangement of FIG. 5 demonstrates the concept that features of seed tanks 30 and 32, as well as inlet openings 82 and inductor boxes 80 are all symmetrical with respect to vertical planes 62. As discussed above, the components are oriented such that left tank 30 and right tank 32 are mirror images. Again, arrow 68 shows that the right tank 32 is identical to and rotated 90 degrees with respect to left tank 30.

Figure 6:
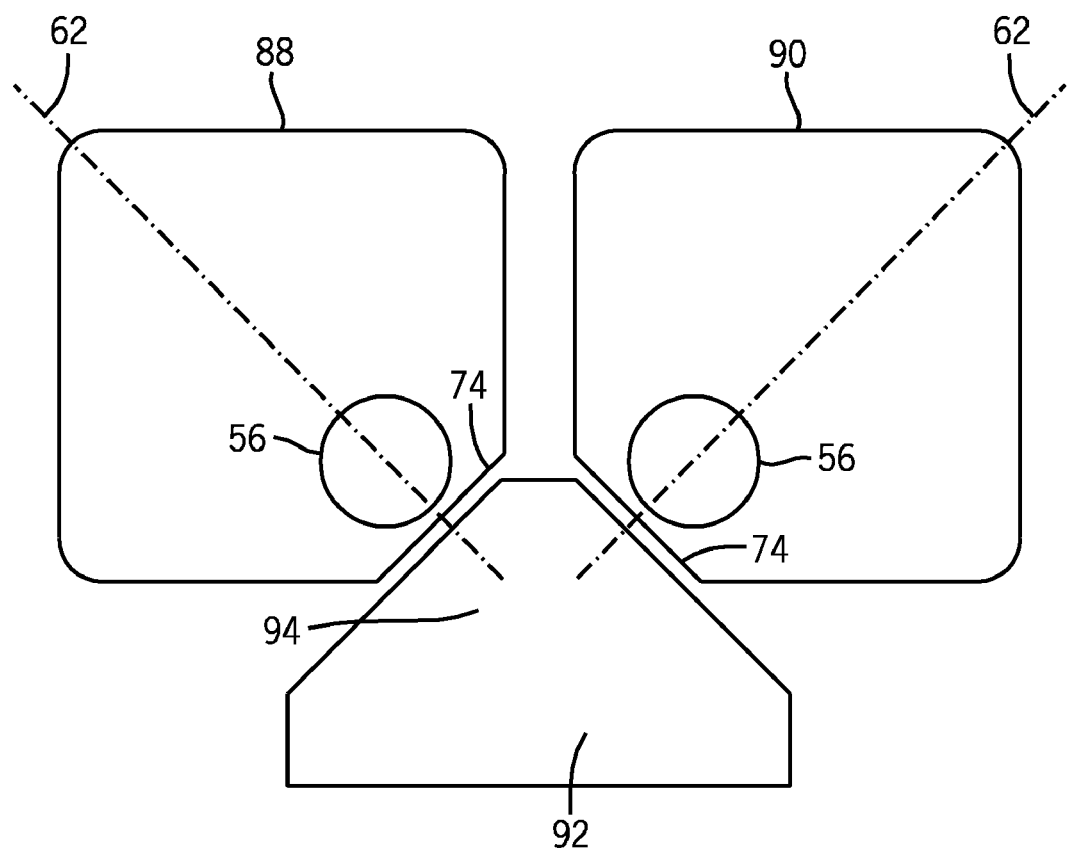
FIG. 6 is a top view of the seed tanks, illustrating recesses in the seed tanks.

In the embodiment illustrated in FIG. 6, angled left tank 88 and angled right tank 90 are shown in a top view. Each tank features recesses 74 which allow for a platform 92. This platform 92 provides improved access to fill openings 56 by allowing an operator to stand in recess 94 while filling or servicing the tanks.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A left and right seed tank for a planter comprising:
   said left and right seed tank supported on a frame;
   each left and right seed tank has a shell defining an interior volume configured to receive seeds;
   each left and right seed tank has a fill opening formed in an upper surface of the shell for loading seeds into the interior volume, the opening being positioned off-center of the upper surface and equidistant from two adjacent sides of the shell, along a generally vertical diagonal plane bisecting the shell,
   a cover disposed over the each fill opening;
   wherein each shell has side angled at approximately 45 degrees with respect to two adjacent sides and centered on the vertical diagonal plane, the angled side being configured to be disposed in a rear position and adjacent to a centerline of the planter when installed;
   whereby the left and right seed tank are identical and orientated at right angles with respect to one another.

2. The seed tank of claim 1, wherein each shell has four sides, and the fill opening is positioned equidistant from a rear side and a side configured to lie adjacent to a centerline of the planter when installed.

3. The seed tank of claim 1, wherein each shell includes a bottom chute disposed symmetrically with respect to the vertical diagonal plane.

4. The seed tank of claim 3, further comprising an inductor box coupled to the chute, the inductor box having openings for receiving a flow of air and for distributing seeds to row units, the openings being disposed symmetrically with respect to the vertical diagonal plane.

5. A left and right seed tank for a planter comprising:
- each left and right seed tank has a shell defining an interior volume configured to receive seeds;
- each left and right seed tank has a fill opening formed in an upper surface of the shell for loading seeds into the interior volume, the opening being positioned off-center of the upper surface;
- wherein the shell and fill opening are laterally symmetrical about a vertical diagonal plane bisecting the seed tank;
- a cover disposed over each fill opening;
- wherein the shell has a side angled at approximately 45 degrees with respect to two adjacent sides and centered on the vertical diagonal plane, the angled side being configured to be disposed adjacent to a centerline of the planter when installed;
- whereby the left and right seed tank are identical and orientated at right angles with respect to one another.

6. The seed tank of claim 5, wherein each shell includes a bottom chute disposed symmetrically with respect to the vertical diagonal.

7. The seed tank of claim 6, further comprising an inductor box coupled to the chute, the inductor box having openings for receiving a flow of air and for distributing seeds to row units, the openings being disposed symmetrically with respect to the vertical diagonal plane.

* * * * *